United States Patent

Shibata et al.

[11] Patent Number: 4,943,893
[45] Date of Patent: Jul. 24, 1990

[54] AUTOMOTIVE ILLUMINATION SYSTEM

[75] Inventors: Hiroki Shibata; Kazuki Takahashi; Keiichi Tajima; Takashi Kurita; Kiyoshi Wada; Kiyoshi Yamashita, all of Shizuoka, Japan

[73] Assignee: Koito Manufacturing Co., Ltd., Tokyo, Japan

[21] Appl. No.: 245,188

[22] Filed: Sep. 16, 1988

[30] Foreign Application Priority Data

Sep. 16, 1987 [JP] Japan .................. 62-229874

[51] Int. Cl.⁵ .................. B60Q 1/12
[52] U.S. Cl. .................. 362/37; 362/43
[58] Field of Search ............ 362/37, 41, 43, 282, 362/284, 346, 802, 40

[56] References Cited

U.S. PATENT DOCUMENTS

| | | | |
|---|---|---|---|
| 3,522,423 | 8/1970 | Biabaud | 362/43 |
| 4,276,581 | 6/1981 | Orii et al. | 362/40 |
| 4,663,696 | 5/1987 | Miyazawa et al. | 362/80 |
| 4,733,333 | 3/1988 | Shibata et al. | 362/80 |
| 4,827,388 | 5/1989 | Miyazawa | 362/61 |
| 4,831,506 | 5/1989 | Miyazawa | 362/61 |

FOREIGN PATENT DOCUMENTS

| | | | |
|---|---|---|---|
| 497726 | 9/1954 | Italy | 362/37 |
| 55-99432 | 7/1980 | Japan | 362/37 |
| 62-77249 | 4/1987 | Japan . | |
| 62-77250 | 4/1987 | Japan . | |
| 62-181938 | 8/1987 | Japan . | |
| 62-244736 | 10/1987 | Japan . | |
| 62-265044 | 11/1987 | Japan . | |
| 62-265045 | 11/1987 | Japan . | |

Primary Examiner—Stephen F. Husar
Assistant Examiner—Richard R. Cole
Attorney, Agent, or Firm—Sughrue, Mion, Zinn, Macpeak & Seas

[57] ABSTRACT

An automotive illumination system with which, when steering the vehicle around a curve or corner, both the path along which the vehicle is to travel and the direction straight ahead of the vehicle are sufficiently illuminated. Four headlamps are provided. Two of the headlamps, preferably the outer two, have directions of illumination fixed in the straight-ahead direction of the vehicle. The other two headlamps have directions of illumination which are controlled in accordance with the steering angle of the vehicle.

8 Claims, 5 Drawing Sheets

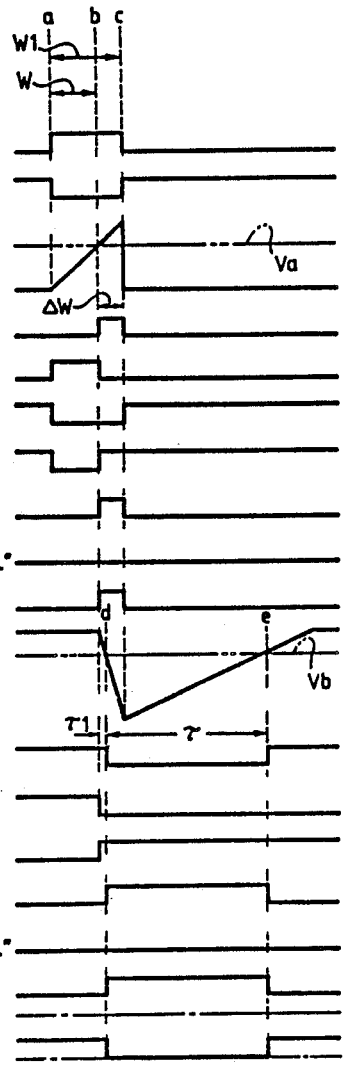

FIG.7 (a) CONTROL SIGNAL
FIG.7 (b) Q1(BASE)
FIG.7 (c) CP1 NON INVERTING INPUT
FIG.7 (d) CP1 OUTPUT
FIG.7 (e) NOR 41b OUTPUT
FIG.7 (f) INVERTER 41c OUTPUT
FIG.7 (g) INVERTER 41d OUTPUT
FIG.7 (h) AND 41e OUTPUT
FIG.7 (i) AND 41f OUTPUT
FIG.7 (j) Q2(BASE)
FIG.7 (k) CP2 NON INVERTING INPUT
FIG.7 (ℓ) CP2 OUTPUT
FIG.7 (m) NOR 43a OUTPUT
FIG.7 (n) NOR 43b OUTPUT
FIG.7 (o) AND 44a OUTPUT
FIG.7 (p) AND 44b OUTPUT
FIG.7 (q) MOTOR DRIVER OUTPUT TERMINAL 45a
FIG.7 (r) MOTOR DRIVER OUTPUT TERMINAL 45b

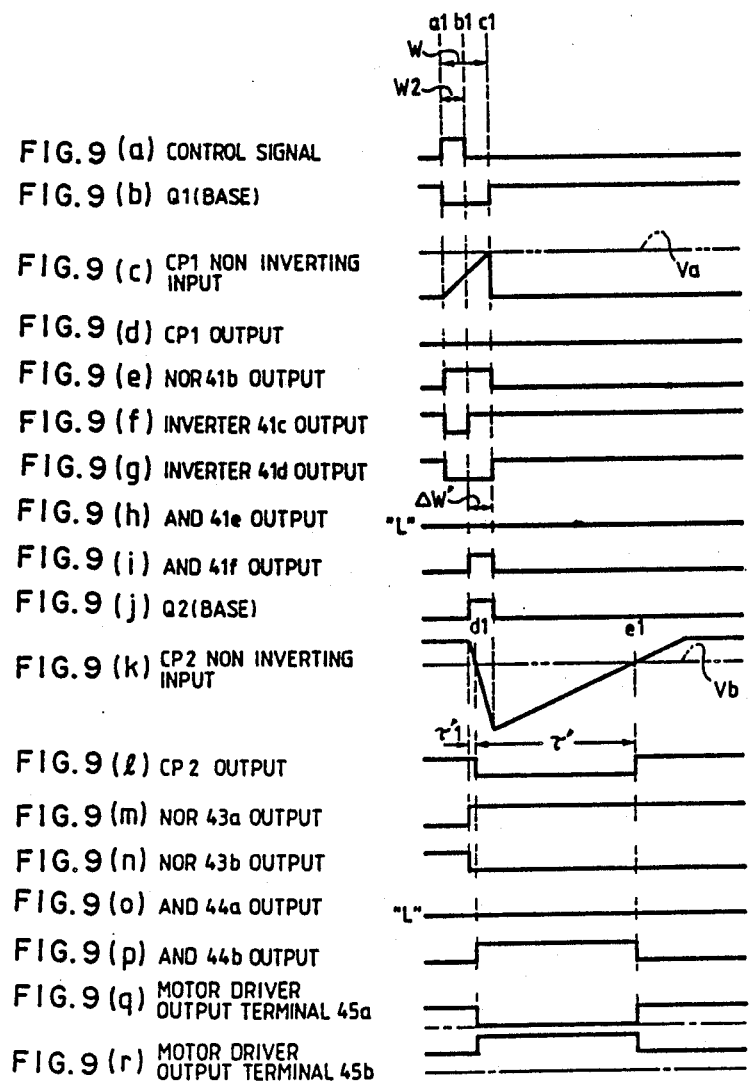

FIG. 9 (a) CONTROL SIGNAL
FIG. 9 (b) Q1(BASE)
FIG. 9 (c) CP1 NON INVERTING INPUT
FIG. 9 (d) CP1 OUTPUT
FIG. 9 (e) NOR 41b OUTPUT
FIG. 9 (f) INVERTER 41c OUTPUT
FIG. 9 (g) INVERTER 41d OUTPUT
FIG. 9 (h) AND 41e OUTPUT
FIG. 9 (i) AND 41f OUTPUT
FIG. 9 (j) Q2(BASE)
FIG. 9 (k) CP2 NON INVERTING INPUT
FIG. 9 (ℓ) CP2 OUTPUT
FIG. 9 (m) NOR 43a OUTPUT
FIG. 9 (n) NOR 43b OUTPUT
FIG. 9 (o) AND 44a OUTPUT
FIG. 9 (p) AND 44b OUTPUT
FIG. 9 (q) MOTOR DRIVER OUTPUT TERMINAL 45a
FIG. 9 (r) MOTOR DRIVER OUTPUT TERMINAL 45b

AUTOMOTIVE ILLUMINATION SYSTEM

BACKGROUND OF THE INVENTION

The present invention relates to an illumination system for an automobile or the like in which the direction of illumination of light from the headlamps of the vehicle is changed in conjunction with the steering of the vehicle.

Since in a conventional automotive illumination system the headlamps emit light only in the straight-ahead direction of the vehicle, the headlamps do not sufficiently illuminate the road in the path followed by the vehicle when traveling around a curve or corner. In order to solve such a problem, an illumination system in which the direction of illumination of light from the headlamps is changed in conjunction with the steering of the vehicle to emit sufficient light in the direction in which the vehicle is actually proceeding has recently been proposed. However, if the both the right and left headlamps are turned so as to change the direction of illumination in conjunction with the rightward or leftward steering of the vehicle, there arises a problem that the field of vision in the straight-ahead direction of the vehicle cannot be sufficiently illuminated. If the direction of illumination of light from only the headlamp provided at the side to which the vehicle is being steered is changed in conjunction with rightward or leftward steering, there is yet another problem that the illuminance in the actual direction in which the vehicle is proceeding is insufficient.

SUMMARY OF THE INVENTION

The present invention was made in order to solve the above-mentioned problems.

In accordance with the present invention, there is provided an illumination system in which four light emitting means are provided on the front of a vehicle with the direction of illumination of light from at least one of the light emitting means being fixed to be nearly the same as the straight-ahead direction of the vehicle, and the direction of illumination of light from the other light emitting means is changed in conjunction with the steering of the vehicle. As a result, the illumination in the field of vision in front of the vehicle can be made sufficiently high not only in the straight-ahead direction of the vehicle but also in the steered direction in which the vehicle is actually travelling.

DESCRIPTION OF THE DRAWINGS

FIGS. 7(a)–7(r) together constitute a timing chart for describing the operation of the illumination direction changing circuit for each of the inner headlamps for rightward steering of the vehicle following straight-ahead steering;

FIGS. 9(a)–9(r) together constitute a timing chart for describing the operation of the illumination direction changing circuit for each of the inner headlamps during leftward steering of the vehicle following straight-ahead steering.

DESCRIPTION OF THE PREFERRED EMBODIMENTS

Preferred embodiments of the present invention are hereafter described in detail with reference to the attached drawings.

Figure 2:
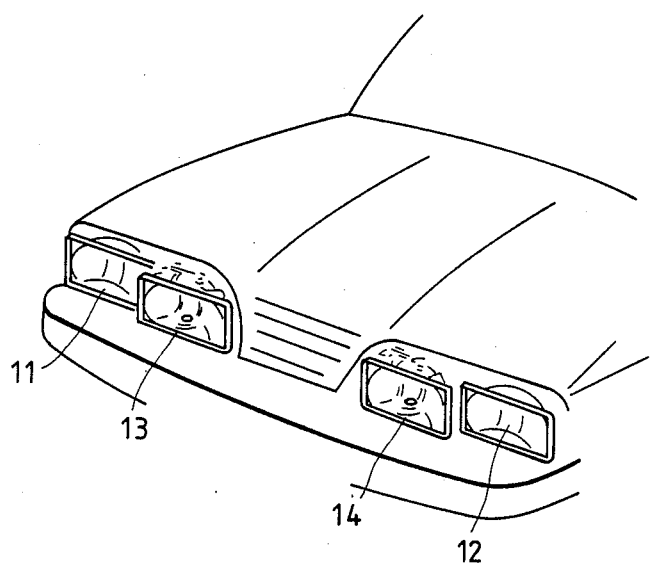
FIG. 2 shows a perspective exterior view of the headlamps attached to the vehicle.

FIG. 2 shows a perspective exterior view of an illumination system constructed accordance with this preferred embodiment. The illumination system includes two headlamps 11 and 13 mounted at the right portion of the front of a vehicle and two other headlamps 12 and 14 mounted at the left portion of the front thereof. The direction of illumination of light from the outer headlamps 11 and 12 is always fixed to be in the straight-ahead direction of the vehicle. The direction of illumination of light from the inner headlamps 13 and 14 can be changed in conjunction with the steering of the vehicle.

Figure 3:
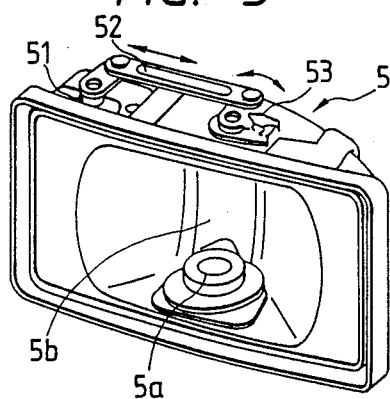
FIG. 3 shows a perspective exterior view of an example of each of two inner headlamps moveable in conjunction with the steering of the vehicle.
Figure 4:
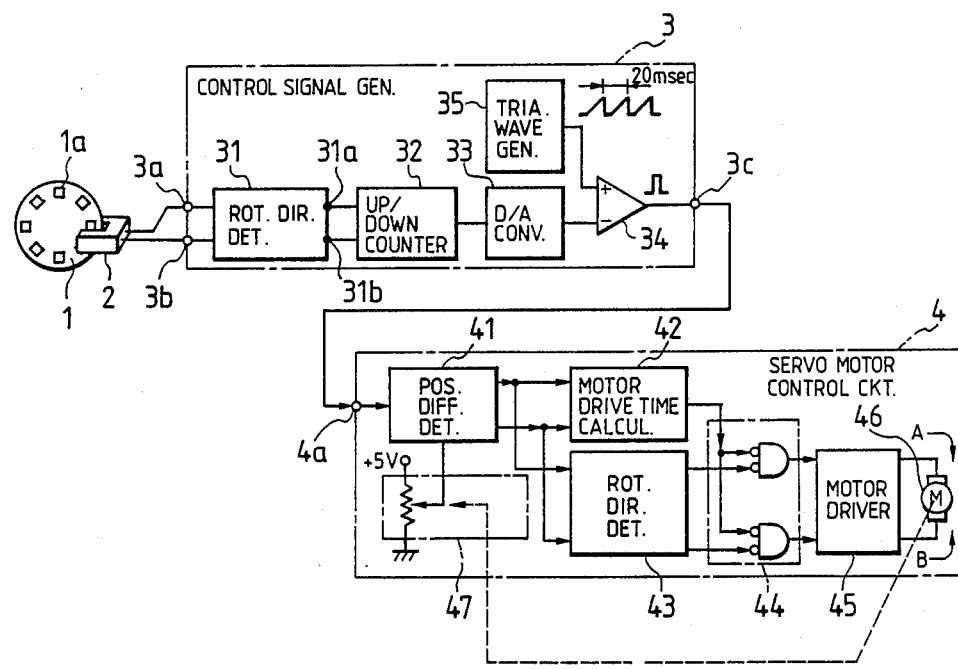
FIG. 4 shows a block diagram of an illumination direction changing circuit for changing the direction of illumination of light from each of the two inner headlamps in conjunction with the steering of the vehicle.

FIG. 3 shows a perspective exterior view of an example of each of the inner headlamps 13 and 14. FIG. 4 shows a block diagram of an illumination direction changing circuit for changing the direction of illumination of light from each of the inner headlamps 13 and 14 in conjunction with the steering of the vehicle. Shown at 1 in FIG. 4 is a rotary disk which is rotated clockwise in conjunction with the rightward steering of the vehicle and counterclockwise in conjunction with the leftward steering thereof. The peripheral portion of the rotary disk 1 has a plurality of slits 1a having the same form and located at equiangular intervals.

Light emitters and light detectors of a light detection unit 2 are mounted opposite one another across the space through which the slits 1a of the disk 1 pass. First and second light detectors composed of the light emitters and the light detectors, respectively, are provided next to each other in the light detection unit 2 so that electric pulse signals having the same waveform but different in phase by about 90° are generated by the first and the second light detectors as the slits 1a of the rotary disk 1 pass through the space along with the clockwise or counterclockwise rotation of the disk. The electric pulse signals are supplied to the rotative direction detector 31 of the control signal generator circuit 3 of the illumination direction changing circuit through terminals 3a and 3b. The rotative direction detector 31 detects the direction of rotation of the rotary disk 1, namely, the direction of rotation of the steering wheel of the vehicle, from the phases of the electric pulse signals, and produces one of an up or down signal accordingly, the number of pulses of which corresponds to the amount of rightward or leftward rotation of the steering wheel of the vehicle.

The up and down signals thereby produced are supplied from the output terminal 31a or 31b of the rotative direction detector 1 to an up/down counter 32, which increases or decreases its count value in an amount determined by the number of up or down signal pulses. A potential corresponding to the count value of the up/down counter 32 is applied to the inverting input terminal of a comparator 34 through a D/A converter 33. A sawtooth-wave reference voltage having a period of 20 msec is applied to the noninverting input terminal of the comparator 34 by a sawtooth wave generator 35. The potential applied to the inverting input terminal of the comparator 34 through the D/A converter 33 is equal to the center of the height of the sawtooth-wave reference voltage when the count value of the up/down counter 32 is zero (the steering wheel of the vehicle is in the straight-ahead position). A control signal produced upon the output terminal of the comparator 34 at this time is a periodic pulse signal having a 50% duty factor. The potential applied to the inverting input terminal of the comparator 34 rises or falls in the D/A converter 33 as the count value of the up/down counter 32 is increased or decreased. In other words, the duty factor of the control signal from the output terminal of the comparator 34 increases or decreases from 50% as the steering wheel of the vehicle is rotated rightward or leftward from the straight-ahead position thereof, so that the pulse width of the control signal periodically supplied from the output terminal of the comparator 34 is changed depending on the rotative angle of the steering wheel. Specifically, the pulse width of the control signal is increased for rightward rotation of the steering wheel and decreased for leftward rotation. The control signal is supplied from the output terminal (which is the output terminal 3c of the control signal generator circuit 3) of the comparator 34 to the servomotor control circuit 4 of the illumination direction changing circuit through an input terminal 4a.

Figure 5:
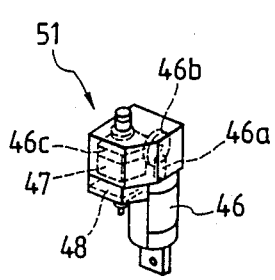
FIG. 5 shows a perspective exterior view of a speed reduction drive mechanism coupled to the electric motor of each of the inner headlamps.

The servomotor control circuit 4 includes a position shift detector 41 which receives the control signal from the input terminal 4a, a motor drive time calculator 42 which receives the output from the position shift detector, a direction of rotation discriminator 43 which receives the output from the position shift detector, an AND gate unit 44 which receives the output from the motor drive time calculator and that from the direction of rotation discriminator, a motor driver 45 for driving an electric motor 46 depending on the output from the AND gate unit, and a potentiometer 47 whose output voltage changes depending on the rotative angular position of the electric motor. The direction of illumination of light from each of the inner headlamps 13 and 14 is changed by the torque of the electric motor 46. When an electrical current in a direction A indicated in FIG. 4 is supplied to the motor 46, the drive shaft 46a thereof (FIG. 5) is rotated clockwise to drive a crown gear 46b and a worm gear 46c so that an auxiliary reflector (subreflector) 5b rotatably supported behind a bulb 5a in each of the inner headlamps 13 and 14 as shown in FIG. 3 is turned to change the direction of illumination of light from the headlamp, in this case, rightward as viewed by the driver. Conversely, when an electrical current in a direction B indicated in FIG. 4 is supplied to the electric motor 46, the drive shaft 46a is rotated counterclockwise to drive the crown gear 46b and the worm gear 46c to turn the auxiliary reflector 5b to change the direction of illumination of light from each of the inner headlamps 13 and 14 leftward as viewed by the driver.

A speed reduction drive mechanism 51 is composed of the crown gear 46b and the worm gear 46c mechanically coupled to the drive shaft 46a of the electric motor 46, and is disposed at the rear of each of the inner headlamps 13 and 14 so that the torque of the mechanism is transmitted by a link 52 to turn the auxiliary reflector 5b rightward or leftward.

When the electric motor 46 is not driven, the auxiliary reflector 5b is forcibly returned to the center (straight-ahead) position by a zeroing mechanism 53 mechanically coupled to the link 52 so that the direction of illumination of light from each of the inner headlamps 13 and 14 is made coincident with the straight-ahead direction of the vehicle.

The potentiometer 47 is attached to the speed reduction drive mechanism 51. A servomotor control board 48 on which the position shift detector 41, the motor drive time calculator 42, the direction of rotation discriminator 43, the AND gate unit 44, and the motor driver 45 are provided is disposed under the potentiometer 47.

Figure 6:
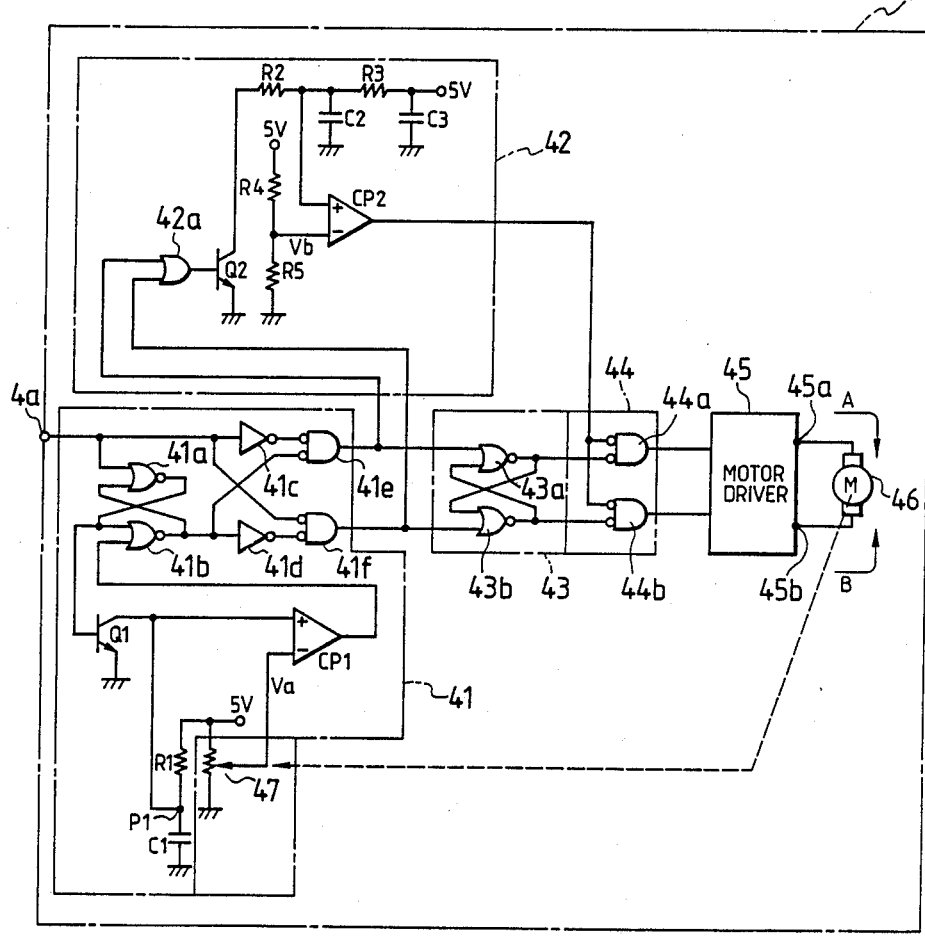
FIG. 6 shows a wiring diagram of a servomotor control circuit of the illumination direction changing circuit.

FIG. 6 shows a wiring diagram of the position shift detector 41, motor drive time calculator 42 and direction of rotation discriminator 43 of the servomotor control circuit 4. The position shift detector 41 includes NOR gates 41a and 41b, inverters 41c and 41d, inverting input AND gates 41e and 41f, an NPN transistor Q1, a comparator CP1, a resistor R1 and a capacitor C1. The potential on the connection point P1 between the resistor R1 and the capacitor C1, which is connected to the collector of the transistor Q1, is applied to the noninverting input terminal of the comparator CP1. The output voltage Va of the potentiometer 47 is applied to the inverting input terminal of the comparator CP1. The motor drive time calculator 42 is composed of an OR gate 42a which receives the outputs from the inverting input AND gates 41e and 41f of the position shift detector 41, an NPN transistor Q2 which receives the output from the OR gate to the base of the transistor, a comparator CP2, resistors R2, R3, R4 and R5 and capacitors C2 and C3. The potential on the connection point between the capacitor C2 and the resistor R2 connected to the collector of the transistor Q2 is applied to the noninverting input terminal of the comparator CP2. The potential Vb on the connection point between the resistors R4 and R5 is applied to the inverting input terminal of the comparator CP2. The direction of rotation discriminator 43 includes NOR gates 43a and 43b which receive the outputs from the inverting input AND gates 41e and 41f of the position shift detector 41 on input terminals of the NOR gates. The outputs from the NOR gates 43a and 43b are applied to input terminals of the inverting input AND gates 44a and 44b of the AND gate unit 44. The output from the comparator CP2 of the motor drive time calculator 42 is applied to the other input terminals of the inverting input AND gates 44a and 44b.

The operation of the illumination direction changing circuit will now be described in detail. It is assumed that the steering wheel of the vehicle is in the straight-ahead position, the auxiliary reflector 5b of each 5 of the inner headlamps 13 and 14 is at the center position thereof, and the direction of illumination of light from each of the inner headlamps is coincident with the straight-ahead direction of the vehicle. Since the count value of the up/down counter 32 at that time is zero, a periodic pulse signal of 50% duty factor is provided as the control signal from the output terminal 3c of the control signal generator circuit 3 to the servomotor control circuit 4. When the steering wheel of the vehicle is thereafter rotated to steer the vehicle rightward, the count value of the up/down counter 32 is decreased depending on the amount of the rightward steering so that the potential applied to the inverting input terminal of the comparator 34 through the D/A converter 33 drops depending on the decreased count value. As a result, the duty factor of the control signal is increased, namely, the pulse width thereof is increased, depending on the amount of the rightward steering. For example, the pulse width W of the control signal for straight-ahead steering of the vehicle is increased to that W1 of the control signal for rightward steering of the vehicle as shown in FIG. 7(a). The control signal is supplied to the position shift detector 41 of the servomotor control circuit 4 so that the potential on the base of the transistor Q1 is made low at a point a (shown in FIG. 7(b) and the transistor is turned off at the rising edge (shown at a point a in FIG. 7(a) of the control signal. Since the transistor Q1 is thus turned off, the capacitor C1 is charged through the resistor R1 so that the potential on the connection point P1 between the capacitor and the resistor, which is applied to the noninverting input terminal of the comparator CP1, begins to rise at a point a shown in FIG. 7(c). At that time, the potential Va (shown in FIG. 7(c) applied to the inverting input terminal of the comparator CP1 through the potentiometer 47 corresponds to the rotative angle of the electric motor 46 in the center position, and is 2.5 V, for example. When the potential on the connection point P1, which is applied to the noninverting input terminal of the comparator CP1, exceeds the potential Va applied to the inverting input terminal thereof, the potential of the output from the comparator CP1 is made high at a point b shown in FIG. 7(d). When the potential on the base of the transistor Q1 is made high again at the falling edge of the control signal at a point c shown in FIG. 7(b), the potential applied to the inverting input terminal of the comparator CP1 is immediately made nearly equal to the ground potential at a point c shown in FIG. 7(c) so that the potential of the output from the comparator becomes low at a point c shown in FIG. 7(d). In other words, the potential of the output from the comparator CP1 is high throughout the period corresponding to the difference $\Delta W = W1 - W$ between the pulse width W1 of the control signal during rightward steering of the vehicle and that W of the control signal for straight-ahead steering of the vehicle. The output from the comparator CP1 appears as that (shown in FIG. 7(h) from the inverting input AND gate 41e so that a high-potential signal of $\Delta W$ in pulse width, which indicates the quantity of the position difference between the present direction of illumination of light from each of the inner headlamps 13 and 14 and the desired direction of illumination therefrom and which is determined to correspond to the rotative angle of the steering wheel of the vehicle, is supplied to the motor drive time calculator 42 and the rotative direction detector 43. Shown in FIGS. 7(e), 7(f), 7(g) and 7(i) are the outputs from the NOR gate 41b, the inverter 41c, the inverter 41d and the inverting input AND gate 41f.

The output from the inverting input AND gate 41e, which is supplied to the motor drive time calculator 42, passes through the OR gate 42a to the base of the transistor Q2 so that the transistor is turned on for the pulse width $\Delta W$ of the output as shown in FIG. 7(j), and the potential applied to the noninverting input terminal of the comparator CP2 begins to fall, at a point b shown in FIG. 7(h), due to the discharge of the capacitor C2 through the resistor R2. When the potential applied to the noninverting input terminal of the comparator CP2 has become lower than that Vb (shown in FIG. 7(k) at the connection point between the resistors R4 and R5, which is applied to the inverting input terminal of the comparator, the potential of the output from the comparator becomes low at a point 4 shown in FIG. 7(l), the capacitor C2 is charged through the resistor R3 so that the potential applied to the noninverting input terminal of the comparator CP2 rises gradually. When the potential applied to the noninverting input terminal of the comparator CP2 has exceeded that Vb applied to the inverting input terminal thereof at a point e in FIG. 7(k), the potential of the output from the comparator becomes high at a point e shown in FIG. 7(l). In other words, for the period $\tau$ corresponding to the pulse width $\Delta W$ determined to correspond to the quantity of the difference in the rotative position of the auxiliary reflector 5b of each of the inner headlamps 13 and 14 between the present direction of illumination of light from the headlamp and the desired direction of illumination, which corresponds to the rotative angle of the steering wheel of the vehicle, the potential of the output from the comparator CP2 is high and the output (which is a position difference calculation signal) is supplied to the inverting input AND gates 44a and 44b of the AND gate unit 44.

The charging time constant determined by the capacitor C2 and the resistor R3 is preset to be longer than the discharge time constant determined by the capacitor and the other resistor R2. The length of the period $\tau$ (which is a position difference calculation time) corresponding to the pulse width $\Delta W$ can be controlled by appropriately designing the charging time constant and the discharge time constant.

Figure 8:
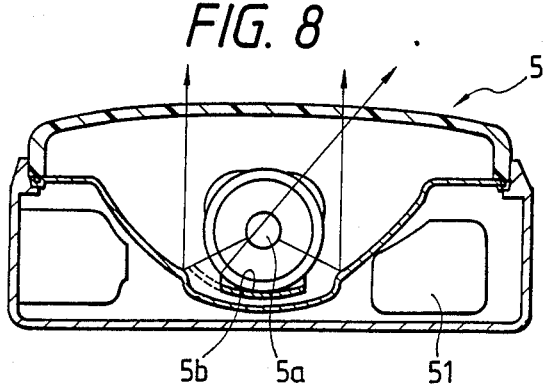
FIG. 8 shows a sectional view of each of the inner headlamps.

Since the outputs (shown in FIGS. 7(m) and 7(n) from the NOR gates 43a and 43b of the direction of rotation discriminator 43 are inverted to low and high potentials, respectively, at the rising edge of the position shift detection signal of $\Delta W$ in pulse width, which is provided at the inverting input AND gate 41e of the position shift detector 41, the motor drive signal generated by the comparator CP2 a time $\tau_1$ after the inverted signal is passed through the inverting input AND gate 44a as shown in FIG. 7(o). The output terminals 45a and 45b of the motor driver 45 are changed from intermediate potentials to high and low potentials, respectively, as shown in FIGS. 7(q) and 7(r), on the basis of the high-potential motor drive signal from the inverting input AND gate 44a, whereby a drive current in the direction A shown in FIG. 6 is supplied to the electric motor 46 for the motor drive time $\tau$. As a result, the drive shaft 46a of the electric motor 46 is rotated clockwise to turn the auxiliary reflector 5b of each of the inner headlamps 13 and 14 to change the direction of illumination of light therefrom, rightward (in the direction of the steering of the vehicle) as viewed by the driver, as shown in FIG. 8. When the direction of illumination from each of the inner headlamps 13 and 14 is changed rightward as mentioned above, the potential Va applied to the noninverting input terminal of the comparator CP1 through the potentiometer 47 rises depending on the rotative angle of the drive shaft 46a of the motor 46, so that the pulse width $\Delta W$ of the position shift detection signal generated on the basis of the next control signal from the control signal generator circuit 3 is reduced and the motor drive time $\tau$ corresponding to the pulse width is shortened. Such operation is repeated so that the direction of illumination of the inner headlamps 13 and 14 exactly coincides with the desired direction of illumination when the pulse width $\Delta W$ of the position shift detection signal reaches zero.

As the present direction of illumination of each of the inner headlamps 13 and 14 approaches the desired direction, the motor drive time period $\tau$ is shortened so that the drive current for the electric motor 46 is cut off within the period of the control signal. In other words, the drive current is supplied to the electric motor 46 only during the motor drive time $\tau$ during each single period of the control signal. Since the rotation of the motor 46 continues due to inertia after the cutoff of the drive current and the period of the control signal is short, the present direction of illumination of light from each of the inner headlamps 13 and 14 will be made to coincide with the desired direction thereof as if the auxiliary reflector 5b were linearly turned. Since the time of the supply of the drive current to the motor 46 is shortened as the present direction of illumination of light approaches the desired direction, the inertial rotative force of the auxiliary reflector 5b is gradually reduced so that the motor is prevented from overrunning when coincidence occurs between the present direction and the desired direction.

When the steering wheel of the vehicle is rotated leftward from the straight-ahead steering position (reverse to the above-described rightward steering operation), the count value of the up/down counter 32 is increased so that the potential applied to the inverting input terminal of the comparator 34 rises depending on the increased count value. As a result, the duty factor of the control signal supplied to the servomotor control circuit 4 is decreased so that the control signal is changed from the pulse width W for the straight-ahead steering position to another pulse width W2, for example, as shown in FIG. 9(a). At the rising edge of the control signal, the transistor Q1 is turned off, and the potential applied to the noninverting input terminal of the comparator CP1 begins to rise at a point a1 shown in FIG. 9(c), the potential of the output from the comparator becoming high at a point c1 shown in FIG. 9(d). Since the transistor Q1 is turned on at that time, the potential applied to the noninverting input terminal of the comparator CP1 becomes equal to ground potential so that the potential of the output from the comparator is instantaneously inverted to be low. The potential of the output from the inverting input AND gate 41f becomes high (at a point b1 shown in FIG. 9(i) at the falling edge of the control signal shown in FIG. 9(a), and becomes low due to the high-potential instantaneous output from the comparator CP1. In other words, the potential of the output from the inverting input AND gate 41f is high throughout the period corresponding to the pulse width difference $\Delta W' = W - W2$ between the pulse width W of the control signal during straight-ahead steering of the vehicle and that W2 of the signal during leftward steering so that a high-potential signal of $\Delta W'$ in pulse width, which indicates the amount of the difference in the rotative position of the auxiliary reflector 5b of each of the inner headlamps 13 and 14 between the present direction of illumination of light therefrom and the desired direction and which is determined to correspond to the rotative angle of the steering wheel, is supplied to the motor drive time calculator 42 and the direction of rotation discriminator 43. In response to the position shift detection signal of $\Delta W'$ in pulse width, the motor drive time calculator 42 generates a motor drive signal for a period $\tau'$ corresponding to the pulse width $\Delta W'$, as shown in FIG. 9(l). Since the potentials of the outputs (shown in FIGS. 9(m) and 9(n)) from the NOR gates 43a and 43b of the direction of rotation discriminator 43 are inverted to be high and low, respectively, at the rising edge of the position shift detection signal of $\Delta W'$ in pulse width, a motor drive signal is generated a time $\tau'$ after the inversion and sent out through the inverting input AND gate 44b as shown in FIG. 9(p). Because of the high-potential motor drive signal sent out through the inverting input AND gate 44b, the potentials on the output terminals 45a and 45b of the motor driver 45 become lower and higher than the middle levels, respectively, as shown in FIG. 9(q) and 9(r), so that a drive current in the direction B indicated in FIG. 4 is supplied to the electric motor 46. As a result, the drive shaft 46a of the motor 46 is rotated counterclockwise to turn the auxiliary reflector 5b of each of the inner headlamps 13 and 14 to change the direction of illumination of light therefrom leftward (in the direction of the steering of the vehicle) as viewed by the driver. At that time, the potential Va applied to the noninverting input terminal of the comparator CP1 through the potentiometer 47 falls depending on the rotative angle of the drive shaft 46a of the motor 46, so that the pulse width $\Delta W'$ of the position shift detection signal generated on the basis of the next control signal from the control signal generation circuit 3 is reduced and the motor drive time $\tau'$ corresponding to the pulse width is shortened. Such operation is repeated so that the present direction of illumination of light from each of the inner headlamps 13 and 14 coincides with the desired direction when the pulse width $\Delta W'$ of the position shift detection signal becomes zero.

Figure 1:
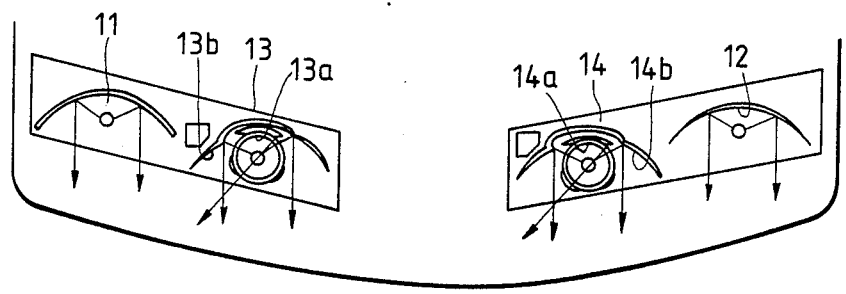
FIG. 1 shows a plan view of an illumination system constructed according to a preferred embodiment of the present invention and including headlamps on a vehicle.

Although rightward steering of the vehicle following straight-ahead steering and leftward steering following straight-ahead steering are described above, the direction of illumination of light from each of the inner headlamps 13 and 14 is also linearly changed to follow the rotative angle of the steering wheel of the vehicle in the case of rightward steering following leftward steering and in the case of leftward steering following rightward steering, as well as in the case of rightward steering following straight-ahead steering and leftward steering following straight-ahead steering. The direction of illumination of light from only the inner headlamps 13 and 14 can thus be changed in conjunction with the rotation of the steering wheel of the vehicle, as shown in FIG. 1, to illuminate the field of vision in the direction of steering of the vehicle by the inner headlamps while illuminating the straight-ahead direction of the vehicle with the outer headlamps 11 and 12. Thus, light is emitted in the direction of the steering of the vehicle from the auxiliary reflectors 13a and 14a of the inner headlamps 13 and 14 and also fixedly emitted in the straight-ahead direction of the vehicle from the main reflectors 13b and 14b of the inner headlamps so as not only to make the illuminance in the field of vision in the straight-ahead direction of the vehicle sufficiently high by the light from the main reflectors of the inner headlamps and that from the outer headlamps 11 and 12, but also to make the illuminance in the field of vision in the direction of the steering of the vehicle sufficiently high by the light from the auxiliary reflectors of the inner headlamps. The safety of the vehicle when operating at night or the like is thus enhanced.

Although the auxiliary reflectors of the inner headlamps are turned in conjunction with the steering of the vehicle in the above-described embodiment, the present invention is not confined thereto but may be otherwise embodied so that the whole inner headlamps are turned in conjunction with the steering of the vehicle. If the whole inner headlamps are turned in conjunction with the steering of the vehicle, the headlamps are likely to be jammed due to snow, freezing or the like and thus require a larger space and a heavier motor than in the above-described embodiment. Therefore, it is preferable that only the auxiliary reflectors of the inner headlamps are turned in conjunction with the steering of the vehicle because headlamps of such type can be made more compact. In other words, in the case that only the auxiliary reflectors of the inner headlamps are turned in conjunction with the steering of the vehicle, the moving parts of the headlamps are housed inside so as to be protected from snow, freezing or the like, and thus a lighter motor and a simpler control circuit can be used.

Although the direction of illumination of light from only the two inner headlamps can be changed in conjunction with the steering of the vehicle in the above-described embodiment, the present invention is not confined thereto but may be otherwise embodied so that the direction of illumination of light from the two outer headlamps or from one or three of the inner and the outer headlamps can be changed in conjunction with the steering of the vehicle.

In general, the present invention is not confined to the above-described embodiments and modifications, but may be embodied or practiced in still other ways without departing from the spirit or essential character thereof.

What is claimed:

1. An illumination system for a vehicle, comprising: four headlamps provided on a front portion of said vehicle, two of said headlamps producing illuminating beams having a direction of illumination fixed in substantially the same as the straight-ahead direction of said vehicle, and the other two of said headlamps each comprising a bulb, a fixed main reflector having a pair of main reflecting surfaces, a rotatable auxiliary reflector, and means for continuously changing a rotational position of said rotatable reflector in conjunction with the steering of said vehicle, said rotatable reflector being positioned behind said bulb between main reflecting surfaces of said main reflector, said rotatable reflector having a range of rotation outside a light path between said bulb and said main reflecting surfaces so that an illumination pattern in said straight ahead direction produced by said main reflecting surfaces is substantially unaffected by rotation of said auxiliary reflector.

2. The illumination system of claim 1, wherein said auxiliary reflector is disposed in a recess in said main reflector between said main reflecting surfaces.

3. An illumination system for a vehicle, comprising:
at least four light emitting means provided on a front portion of said vehicle, the direction of illumination of light from at least one of said light emitting means being fixed in substantially the same as the straight-ahead direction of said vehicle; and
a illumination direction changing means comprising a rotatable auxiliary reflector for changing the direction of illumination of light from the other of said light emitting means in conjunction with the steering of said vehicle, said illumination direction changing means further comprising:
servo motor means for setting a rotational position of said auxiliary reflector, said servo motor means having first and second inputs for effecting rotation of said auxiliary reflector in respective first and second rotational directions;
means for producing a feedback signal indicative of a present rotational position of said auxiliary reflector;
control signal generator means for producing a control signal having a pulse width dependent on a steering angle;
position shift detecting means operating in response to said control signal and said feedback signal for producing first and second position-shift signals having pulse widths indicative of amounts of deviation of said auxiliary reflector from a desired position indicated by said control signal for clockwise and counterclockwise movement, respectively, of said steering wheel;
motor drive time calculating means for producing in response to said first and second position-shift signals a motor driving signal having a duration determined by one of said first and second position-shift signals; and
direction of rotation discriminating means operating in response to said first and second position-shift signals for applying said motor drive signal to a one of said first and second inputs of said servo motor means selected in accordance with a direction of rotation of said steering wheel.

4. The illumination system of claim 3, wherein said means for producing said feedback signal comprises a potentiometer having a control input shaft coupled to an output shaft of said servo motor means.

5. The illumination system of claim 3, wherein said control signal generator means comprises: means for producing first and second pulse signals indicative of rotation of said steering wheel in respective directions; bidirectional counter means having a first input for causing said counter means to count in a first direction and a second input for causing said counter means to count in a second direction, said first and second inputs receiving said first and second pulse signals; a digital-to-analog converter having an input coupled to a count output of said counter means; a sawtooth wave generator; and a comparator receiving as inputs an output of said digital-to-analog converter and an output of said sawtooth wave generator.

6. The vehicle cornering headlamp system of claim 3, wherein said position shift detecting means comprises: a first latch circuit receiving said control signal on a first input thereof; a comparator having a first input receiving said feedback signal and an output coupled to a second input of said latch circuit; a switching transistor having an input coupled to an output of said first latch circuit; an RC time constant circuit coupled to an output element of said switching transistor and a second input of said comparator; and a gate means having a first input receiving said control signal and a second input coupled to an output of said first latch circuit.

7. The vehicle cornering headlamp system of claim 6, wherein said position shift detecting means comprises a second latch circuit having inputs coupled to respective outputs of said gate means.

8. The vehicle cornering headlamp system of claim 3, wherein said motor drive time calculating means comprises an OR gate receiving as inputs said first and second position-shift signals; a switching transistor having an input control element coupled to an output of said OR gate; a reference voltage source; a comparator having a first input coupled to said reference voltage source; and an RC time constant circuit coupled to an output element of said switching transistor and a second input of said comparator.

* * * * *